(12) United States Patent
Niwa et al.

(10) Patent No.: US 8,991,739 B2
(45) Date of Patent: Mar. 31, 2015

(54) WEB WINDING APPARATUS

(71) Applicant: JTEKT Corporation, Osaka-shi (JP)

(72) Inventors: Naohisa Niwa, Nagoya (JP); Toshiyoshi Ichikawa, Anjo (JP); Norihito Sakakibara, Toyota (JP)

(73) Assignee: JTEKT Corporation, Osaka-shi (JP)

( * ) Notice: Subject to any disclaimer, the term of this patent is extended or adjusted under 35 U.S.C. 154(b) by 137 days.

(21) Appl. No.: 13/790,232

(22) Filed: Mar. 8, 2013

(65) Prior Publication Data

US 2013/0248640 A1    Sep. 26, 2013

(30) Foreign Application Priority Data

Mar. 26, 2012    (JP) ................. 2012-069297

(51) Int. Cl.
| | |
|---|---|
| *B65H 23/00* | (2006.01) |
| *B65H 19/26* | (2006.01) |
| *B65H 19/28* | (2006.01) |
| *B65H 19/30* | (2006.01) |

(Continued)

(52) U.S. Cl.
CPC ............. *B65H 19/26* (2013.01); *B65H 19/28* (2013.01); *B65H 19/30* (2013.01); *B65H 19/22* (2013.01); *F16P 1/04* (2013.01); *B65H 2301/41422* (2013.01); *B65H 2301/41445* (2013.01); *B65H 2402/441* (2013.01); *B65H 2402/443* (2013.01); *B65H 2407/10* (2013.01); *B65H 2407/30* (2013.01); *Y10S 242/913* (2013.01)
USPC ............. 242/548; 242/566; 242/913

(58) Field of Classification Search
USPC .............. 242/527, 533, 548, 566, 913
See application file for complete search history.

(56) References Cited

U.S. PATENT DOCUMENTS

| | | | |
|---|---|---|---|
| 1,575,088 A | * | 3/1926 | Bartlett ............... 74/613 |
| 2,767,931 A | | 10/1956 | Woods et al. |

(Continued)

FOREIGN PATENT DOCUMENTS

| | | |
|---|---|---|
| DE | 10 2005 000 044 A1 | 11/2006 |
| DE | 10 2007 001 671 B3 | 3/2008 |

(Continued)

OTHER PUBLICATIONS

Extended European Search Report issued Feb. 17, 2014 in Patent Application No. 13159354.3.

(Continued)

*Primary Examiner* — Sang Kim
(74) *Attorney, Agent, or Firm* — Oblon, McClelland, Maier & Neustadt, L.L.P.

(57) ABSTRACT

A web winding apparatus comprises a cutter, a web pressing member and a roller which are movable together between two bobbins supported respectively by two rotational center members. The cutter cuts a web being transferred, the web pressing member presses an end portion of the web cut with the cutter on the bobbin being empty, and the roller transfers the web being transferred to come, toward the bobbins. The apparatus further comprises two peripheral covers independently turnable around the rotational center members and respectively covering parts of outer peripheral surfaces of the webs wound on the two bobbins. Each of the peripheral covers respectively having circumferential openings is turnable selectively to a first position to direct the circumferential opening toward the roller and a second position to partition the bobbin side covered thereby and the roller side.

3 Claims, 8 Drawing Sheets (51) Int. Cl.
  *B65H 19/22* (2006.01)
  *F16P 1/04* (2006.01)

(56) References Cited

U.S. PATENT DOCUMENTS

| | | | |
|---|---|---|---|
| 4,282,963 A | | 8/1981 | Kafura et al. |
| 6,059,216 A | | 5/2000 | Ogura |
| 6,588,698 B2 | * | 7/2003 | Gangemi et al. ............... 242/534 |
| 6,616,085 B2 | * | 9/2003 | Fuchs et al. .................... 242/534 |

FOREIGN PATENT DOCUMENTS

| | | |
|---|---|---|
| EP | 1 174 375 A2 | 1/2002 |
| EP | 1 174 375 A3 | 1/2002 |
| EP | 1 619 156 A1 | 1/2006 |
| EP | 1 717 178 A2 | 11/2006 |
| EP | 1 717 178 A3 | 11/2006 |
| EP | 2 251 290 A1 | 11/2010 |
| JP | 2807857 B2 | 7/1998 |
| JP | 3506818 B2 | 12/2003 |

OTHER PUBLICATIONS

U.S. Appl. No. 13/790,539, filed Mar. 8, 2013, Niwa, et al.
U.S. Appl. No. 13/790,676, filed Mar. 8, 2013, Niwa, et al.

* cited by examiner

WEB WINDING APPARATUS

INCORPORATION BY REFERENCE

This application is based on and claims priority under 35 U.S.C. 119 with respect to Japanese patent application No. 2012-069297 filed on Mar. 26, 2012, the entire content of which is incorporated herein by reference.

BACKGROUND OF THE INVENTION

1. Field of the Invention

The present invention relates to a web winding apparatus for winding a web being transferred to come, on a bobbin.

2. Discussion of the Related Art

Heretofore, as web winding apparatuses, there have been known those described in JP2807857 B (JP7-101604 A) and JP3506818 B (JP9-063565 A). In these apparatuses, a member with two bobbins supported thereon is provided to be turnable, and through the turn of the member, a bobbin filled with winding turns of the web is dismounted therefrom, while a bobbin being empty can wind the web that is transferred to come during that time.

In the apparatuses, the member supporting the two bobbins one of which is filled with winding turns of the web is turned in exchanging the mutual positions of the bobbin being empty and the bobbin filled with winding turns of the web, and this makes the apparatuses increased in dimension and complicated in construction. In the apparatuses of this kind, it is important to secure the safety for the operator in dismounting the filled-up bobbin.

SUMMARY OF THE INVENTION

It is therefore an object of the present invention to provide a web winding apparatus capable of being simple in construction and of enabling a bobbin filled with winding turns of a web to be dismounted safely as a web is continuously transferred to be wound on another bobbin being empty.

According to the present invention in a first aspect, there is provided a web winding apparatus, which comprises support bodies; two rotational center members rotatably supported respectively by the support bodies; two bobbins supported respectively by the two rotational center members; a cutter provided movably between the bobbin on one side and the bobbin on the other side for cutting a web being transferred; a web pressing member provided movably together with the cutter and operable for pressing an end portion of the web cut with the cutter, on the bobbin being empty to wind the end of the web on the empty bobbin; a roller provided movably together with the cutter and operable for transferring the web being transferred to come, toward the bobbins; and two peripheral covers provided on the support bodies to be independently turnable around the rotational center members and respectively covering parts of outer peripheral surfaces of the webs wound on the two bobbins, each of the peripheral covers having a circumferential opening. Each of the peripheral covers respectively covering the bobbins is turnable selectively to a first position to direct the circumferential opening toward the roller in winding the web on one of the bobbins and a second position to partition the one side of the bobbins and the roller side in dismounting the one of the bobbins from one of the rotational center members.

With this construction, the cutter, the web pressing member and the roller are movable between the two bobbins. Then, when the winding of the web on each bobbin is completed, the cutter, the web pressing member and the roller are evacuated, so that it becomes possible to dismount each such bobbin from the rotational center member without moving the same. Accordingly, it is not required to provide a large-scale transfer device as is required in the prior art, and hence, the apparatus can be simplified in construction though being able to continuously transfer the web. Further, the apparatus is provided with the peripheral covers having the circumferential openings. In winding the web on either one of the bobbins, the web is enabled to pass through the circumferential opening of the peripheral cover mating with the either one of the bobbins. Therefore, each peripheral cover does not impede the winding of the web on the bobbin mating with each such peripheral cover. On the other hand, in dismounting each bobbin from the rotational center member, the peripheral cover mating with each such bobbin is turned to partition the roller side and the bobbin side. Accordingly, the operator can safely dismount each bobbin from the rotational center member.

BRIEF DESCRIPTION OF THE ACCOMPANYING DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT (Examples of Objects Handled by Web Winding Apparatus)

For example, in the manufacturing of lithium cells or batteries, a film-like sheet such as aluminum foil or the like is prepared in the form of a roll shape in advance. The manufacturing includes steps of unwinding the sheet from an unwinding device, subjecting the sheet to a coating treatment, and after drying, winding the sheet again in the roll shape. In one of the manufacturing steps, a web winding apparatus in the present embodiment is used as the device for winding the sheet in the form of a roll shape. That is, the web winding apparatus winds in the form of a roll shape the web that is transferred to come thereto after the coating and drying. Particularly, the web winding apparatus in the present embodiment is an apparatus capable of winding the web transferred thereto without being provided with a device for storing the web and without stopping the transferring of the web. It is to be noted that although the web winding apparatus in the present embodiment will be described by exemplifying the manufacturing for lithium batteries, it is applicable to any other apparatuses that are designed to wind a web in the form of a roll shape.

(Exterior Construction of Web Winding Apparatus)

Figure 1:
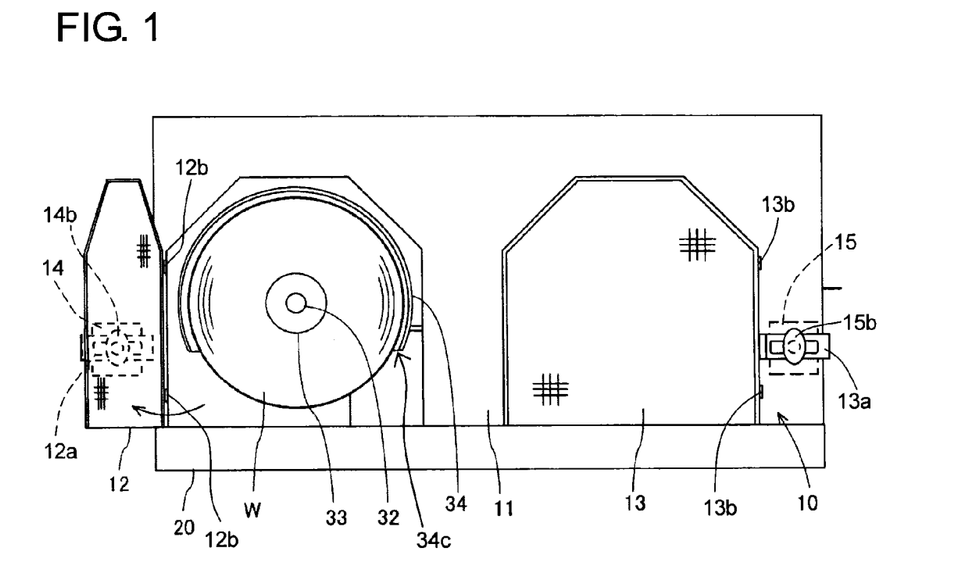
FIG. 1 is an external front view of a web winding apparatus in the state that an opening/closing cover on the left side has been opened.
Figure 2:
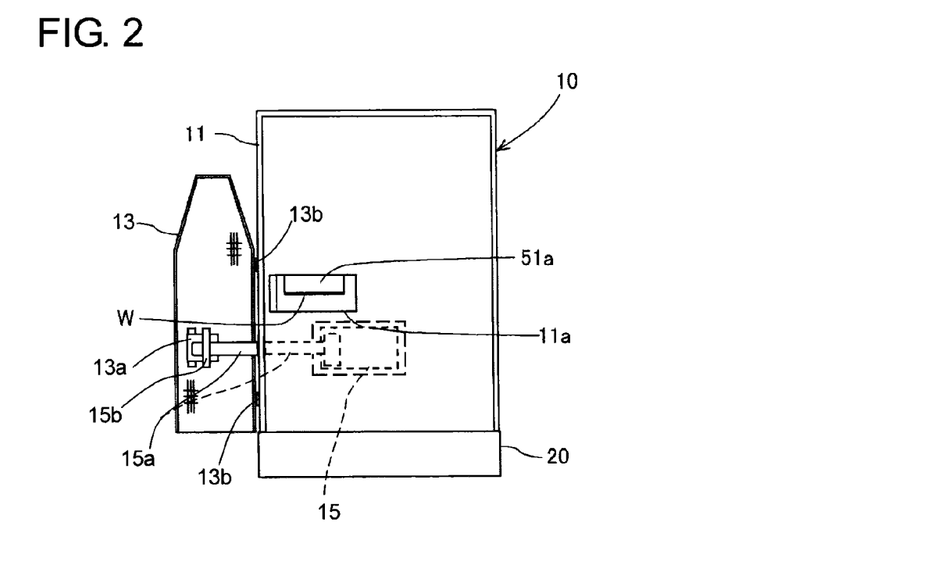
FIG. 2 is a right side view of the web winding apparatus in FIG. 1.

The exterior construction of the web winding apparatus in the present embodiment will be described with reference to FIGS. 1 and 2. As shown in FIGS. 1 and 2, the web winding apparatus is surrounded by an overall cover 10. The overall cover 10 is provided with a fixed cover 11 fixed to a bed (base) 20 and two opening/closing covers 12, 13 each capable of being opened and closed, respectively at left and right on the front side of the fixed cover 11. Each of the opening/closing covers 12, 13 is opened when a web W having been wound in the form of a roll shape is taken out, and remains closed while the web W is being wound. FIGS. 1 and 2 show the opening/closing cover 12 on the left side in an open state and the opening/closing cover 13 on the right side in a closed state.

Further, the wed is transferred to come from the right side in FIG. 1. Thus, as show in FIG. 2, an opening window 11a is formed on a right side surface of the fixed cover 11 in order to take inside the web W being transferred to come.

(Interior Construction of Web Winding Apparatus)

Next, the interior construction of the web winding apparatus will be described with reference to FIGS. 3 to 7 in which the overall cover 10 is omitted for better understanding. The web winding apparatus is provided with a first web support device 30, a second wed support device 40, a transfer device 50 and a cutting and joining device 60.

The first and second web support devices 30, 40 are provided with support bodies 31, 41 (frames), rotational center members 32, 42, bobbins 33, 43 and peripheral covers 34, 44, respectively. The support bodies 31, 41 stand upright on the bed 20 on left and right sides of the bed 20 as viewed from the front side. The support bodies 31, 41 may be fixed on the bed 20 or may be provided on the bed 20 movably in a front-rear direction (the direction normal to the drawing sheet of FIG. 3).

The rotational center members 32, 42 are provided to protrude from front vertical walls of the respective support bodies 31, 41 and to be rotatable about respective axes that extend in the front-rear direction in parallel to each other. The rotational center members 32, 42 rotate about the respective axes in the same direction (i.e., clockwise as viewed in FIG. 3). The respective bobbins 33, 43 are detachably supported on the respective rotational center members 32, 42 and each operate to wind thereon the web W transferred to come thereto. That is, since the bobbins 33, 43 rotate about the respective center axes in the same direction (clockwise in FIG. 3), the directions in which the bobbins 33, 43 wind the web W become the same clockwise in FIG. 3. Further, a double-sided adhesive tape or adhesive agent is applied to a part on each of the bobbins 33, 43 for adhering an end portion of the web W thereto.

The peripheral covers 34, 44 are provided on the respective support bodies 31, 41 and are turnable in both directions around the rotational center members 32, 42 independently of the same, respectively. The peripheral covers 34, 44 cover up parts of the webs W wound respectively on the bobbins 33, 43 and have openings in the circumferential direction thereof. That is, the peripheral covers 34, 44 take the form of a C-letter. Through turn movements, the peripheral covers 34, 44 are movable to the positions (first positions) where the circumferential openings 34c, 44c face each other and to the positions (second positions) where the circumferential openings 34c, 44c face the bed 20 side (are directed downward in FIG. 3). Further, the peripheral covers 34, 44 are formed to have the exterior shape which is smaller slightly in dimension than the interior shape of the opening/closing covers 12, 13, as illustrated in FIG. 1.

The transfer device 50 is provided with a first transfer-roller support pedestal 51, a second transfer-roller support pedestal 52, and transfer rollers 51a, 51b, 52a-52c that transfer the web W. The first transfer-roller support pedestal 51 stands upright on the bed 20 at the right end of the same and rotatably supports the transfer rollers 51a, 51b respectively at a center portion and an upper end portion thereof in the vertical direction. The second transfer-roller support pedestal 52 stands upright on the bed 20 at a center portion in the left-right direction and rotatably supports the transfer rollers 52a-52c at an upper end portion thereof in the vertical direction.

The web W transferred to come from outside is transferred to travel on the rollers 51a, 51b, 52a, 52b and 52c in turn. These transfer rollers 51a, 51b, 52a-52c are freely rotatable.

In particular, the transfer roller 52b is supported by a mechanism having a tension adjusting function and is movable slightly relative to the second transfer-roller support pedestal 52. Although the transfer rollers 51a, 51b, 52a-52c are designed as freely rotatable rollers, there may be provided one or more rotational driving sources therefor.

The cutting and joining device 60 is arranged at a center portion between the first and second web support devices 30, 40 in the left-right direction and transfers to one of the bobbins 33, 43 the web W which is transferred by the transfer device 50 from outside to the center portion between the first and second web support devices 30, 40 in the left-right direction. Further, when one of the bobbins 33, 43 is filled with winding turns of the web W, the cutting and joining device 60 cuts the web W and winds a cut end of the web W on the other of the bobbins 33, 43.

The cutting and joining device 60 is provided with a guide base 61, a slide head 62, a pivot plate 63, a lead roller 64, a cutter unit 65 and a web pressing unit 66. The guide base 61 is provided on the bed 20 at a center portion between the support bodies 31, 41 in the left-right direction and has rails 61a extending in the left-right direction, on an upper surface thereof. The guide base 61 is arranged on the front side of the second transfer-roller support pedestal 52.

The slide head 62 is provided on the upper surface of the guide base 61 slidably along the rails 61a in the left-right direction. That is, the slide head 62 is slidable between the bobbin 33 on one side and the bobbin 43 on the other side. The pivot plate 63 is provided at a front, vertical wall surface of the slide head 62 pivotably in both directions about an axis extending in the front-rear direction. The lead roller 64 is provided at the front surface of the pivot plate 63 freely rotatably about an axis extending in the front-rear direction. The lead roller 64 is a roller that receives the web W transferred from the transfer roller 52c and transfers the web W toward the bobbins 33, 43.

The cutter unit 65 is supported by the pivot plate 63 and is able to be drivingly turned relative to the pivot plate 63 in the same direction as the rotational direction of the bobbins 33, 43. That is, the cutter unit 65 is movable between the bobbin 33 on one side and the bobbin 43 in the other side. The turn center of the cutter unit 65 is set to be offset from the rotational center of the lead roller 64 as viewed in FIG. 3. The cutter unit 65 is provided with a cutter member 65a and first and second rollers 65b, 65c.

Figure 6:
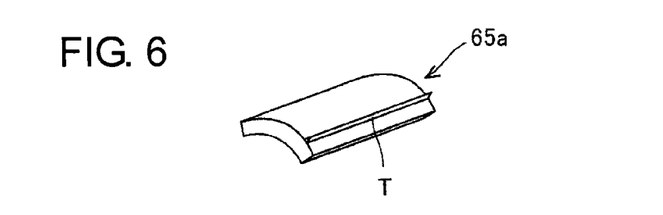
FIG. 6 is an enlarged perspective view of a cutter member shown in FIG. 3.

As shown in FIG. 6, the cutter member 65a has a circular arc convex surface at a radially outside thereof. The circular arc convex surface of the cutter member 65a is formed to a circular arc surface centered at the axis for the clockwise turn of the cutter unit 65. The cutter member 65a has a cutter T for cutting the web W, at one end portion in the circumferential direction of the circular arc (that is, on an advanced end side in the turn direction). The cutter T is wider in width than the web W. The first and second rollers 65b, 65c are provided on the back side of the cutter member 65a and are freely rotatable.

The web pressing unit 66 is supported by the pivot plate 63 and is able to be drivingly turned relative to the pivot plate 63 in an opposite direction (counterclockwise as viewed in FIG. 3) to the rotational direction of the bobbins 33, 43. That is, the web pressing unit 66 moves together with the cutter unit 65 between the bobbin 33 on one side and the bobbin 43 on the other side. The turn center of the web pressing unit 66 is set to be offset from the rotational center of the lead roller 64 and the turn center of the cutter unit 65, as viewed in FIG. 3. Further, the web pressing unit 66 is provided at a position where it faces the cutter unit 65 so as to put the web W transferred from the lead roller 64 between itself and the cutter unit 65.

Figure 7:
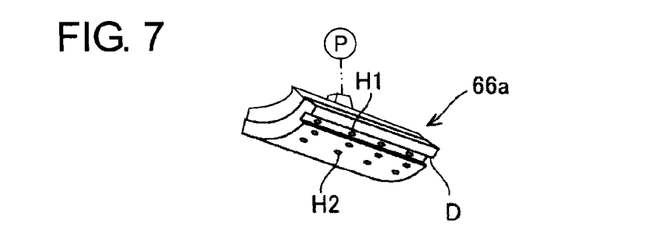
FIG. 7 is an enlarged perspective view of a web pressing member shown in FIG. 3.

The web pressing unit 66 is provided with a web pressing member 66a and first and second rollers 66b, 66c. As shown in FIG. 7, the web pressing member 66a has a circular arc convex surface at the radial outside thereof. The circular arc convex surface of the web pressing member 66a is formed to a circular arc convex surface centered at the center for the counterclockwise turn of the web pressing unit 66. The web pressing member 66a has a groove D that serves as surface to receive the cutter T, around at one end portion in the circumferential direction of the circular arc (i.e., on an advanced end side of the turn direction). In other words, the web pressing member 66a operates as cutter receiving surface.

Further, the circular arc convex surface of the web pressing member 66a is formed to be located to contact the circular arc convex surface of the cutter member 65a or to have such a slight clearance as to be able to grip the web relative to the circular arc convex surface of the cutter member 65a. That is, the web pressing member 66a operates to press the web W in cooperation with the cutter member 65a so that the web W can be cut by the cutter T. Further, the web pressing member 66a is formed to be located to contact the lead roller 64 or to have such a slight clearance as to be able to grip the web relative to the lead roller 64.

Further, as shown in FIG. 7, the web pressing member 66a has pluralities of pump suction holes H1, H2 respectively at the groove D and the circular arc convex surface. These pump suction holes H1, H2 are in fluid communication with a common vacuum pump P, as schematically illustrated in FIG. 7. The pump suction holes H1 at the groove D draws dust that is produced at the time of cutting the web W, by the drawing force (vacuum force) of the pump P (dust drawing means). Further, the pump suction holes H2 at the circular arc convex surface draws and holds the cut end of the web W so cut, by the drawing force of the pump P (holding means). Of course, the suction holes H1 at the groove D also operate to hold the cut end of the web W in addition to the dust drawing operation. The downsizing can be realized by using the common pump P for the dust drawing and for the holding of the web W. Further, by using the drawing force of the pump P for the both means, the web pressing member 66a becomes simple in construction.

Besides the drawing force by the pump P, there may be used a drawing force by static electricity and a drawing force by magnetic force for the function of holding the cut end of the web W. Where static electricity is employed, it is preferable for example to use a low-conductivity material such as resin, ceramics or the like for the cutter member 65a and to use a high-conductivity material such as metal or the like for the web pressing member 66a.

Further, the web pressing member 66a presses the circular arc convex surface on the bobbin 33/43 being empty in the state that it continues holding the cut end of the web W. As a consequence, the cut end of the web W is pressed on the empty bobbin 33/43, so that there begins a winding of the cut end of the web W on the empty bobbin 33/43.

The first and second rollers 66b, 66c of the web pressing unit 66 are provided on the back side of the web pressing member 66a and are freely rotatable. The second roller 66c operates as touch roller so that during the winding of the web W on the bobbin 33/43, the wed W transferred from the lead roller 64 to the bobbin 33/43 side is wound always at a fixed angle relative to the outer peripheral surface of the bobbin 33/43 and the outer peripheral surface of the wound web W.

The lead roller 64, the cutter unit 65 and the web pressing unit 66 are rotatably supported by the pivot plate 63. Therefore, by pivoting the pivot plate 63 in both directions, there occurs a state that the web pressing unit 66 is rocked as viewed with the cutter unit 65 taken as reference.

(Web Winding Operation in Web Winding Apparatus)

Figure 3:
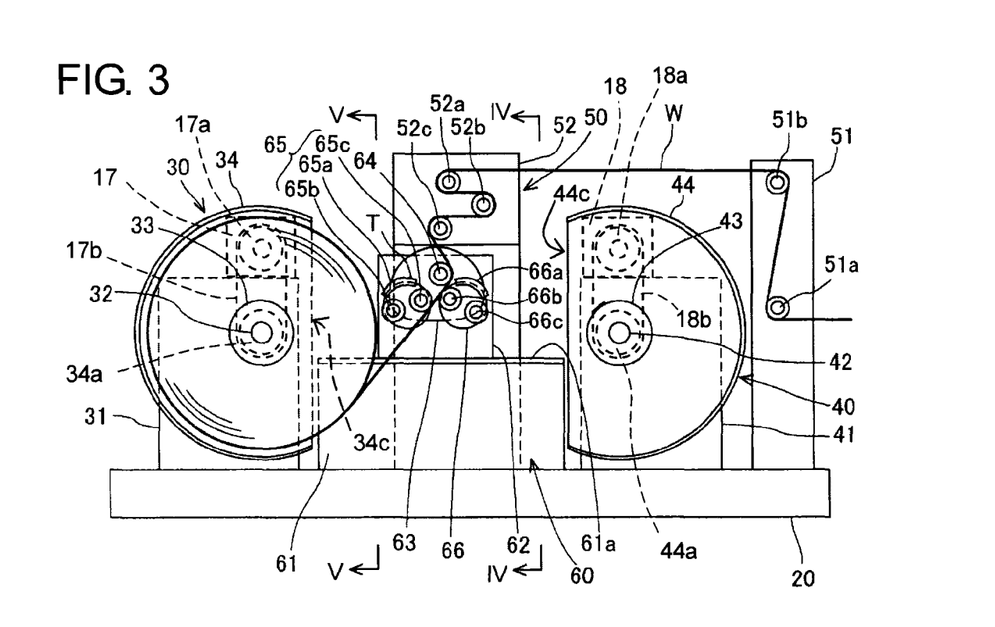
FIG. 3 is a front view of the web winding apparatus shown in FIG. 1 with an outer frame cover having been removed.
Figure 4:
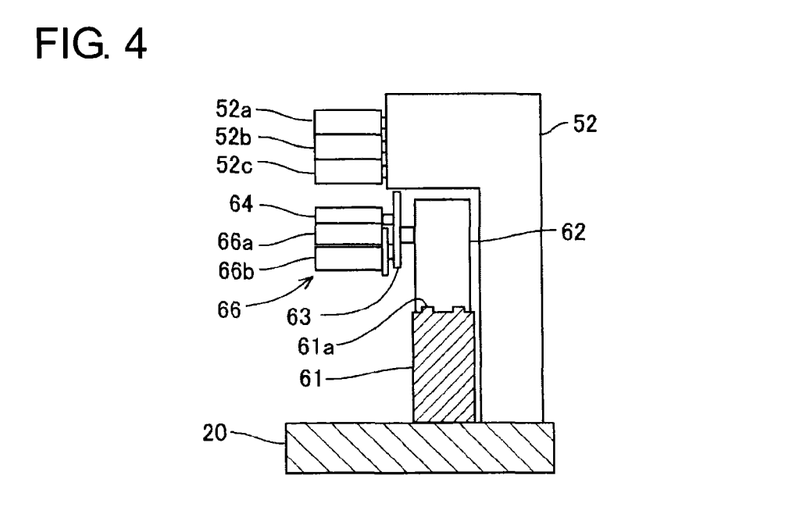
FIG. 4 is a sectional view of the apparatus taken along the line IV-IV in FIG. 3, wherein a bobbin, a peripheral cover and the like located at the deep side in FIG. 4 (the left side in FIG. 3) are omitted from illustration.

Next, the operation of the web winding apparatus will be described with reference to FIGS. 3 and 8 to 21. It is to be noted that FIGS. 8 to 10 and 12 to 21 only illustrate parts of the construction. The state shown in FIG. 3 is supposed as initial state. The web winding apparatus involves an operation to start the winding of the web W on the bobbin 33/43 being empty and to bring the bobbin 33/43 into the state of being filled with winding turns of the web W (web winding operation) and another operation to dismount the filled-up bobbin 33/43 (bobbin dismounting operation). For ease in description, the web winding operation will be described first, and the bobbin dismounting operation will be described then.

(Web Winding Operation in Web Winding Apparatus)

In the state shown in FIG. 3, the left bobbin 33 is winding the web W and is just before the winding completion. At this time, the slide head 62 is almost at the center between the bobbins 33, 43. Further, the peripheral covers 34, 44 have been positioned to make the circumferential openings 34c, 44c thereof face each other, that is, to direct the circumferential openings 34c, 44c thereof toward the lead roller 64.

Figure 8:
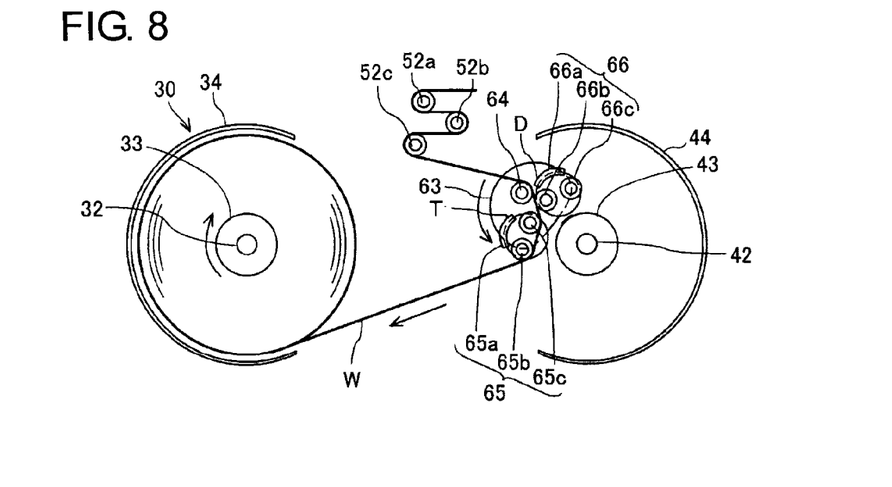
FIG. 8 is an illustration showing the state that upon completion of the winding on a left bobbin, a web cutting and joining device has been moved to the right bobbin side.

From this initial state, the operation is started to cut the web W without stopping the transfer of the web W and to wind the end portion of the cut web W on the right bobbin 43 being empty. First of all, from the initial state, the pivot plate 63 is pivoted counterclockwise to reach a set phase and directs the cutter unit 65 and the web pressing unit 66 toward the right bobbin 43 side, as shown in FIG. 8. Further, the slide head 62 is moved toward the right bobbin 43 side to make the cutter unit 65 and the web pressing unit 66 come close to the right bobbin 43. At this time, the lead roller 64 and the second and first rollers 65c, 65b of the cutter unit 65 transfer the web W toward the bobbin 33 side.

In this state, because the right bobbin 43 rotates clockwise, the web pressing member 66a in winding the end portion of the web W on the right bobbin 43 is located at the advanced side in the rotational phase of the right bobbin 43 relative to the cutter T of the cutter member 65a.

Figure 9:
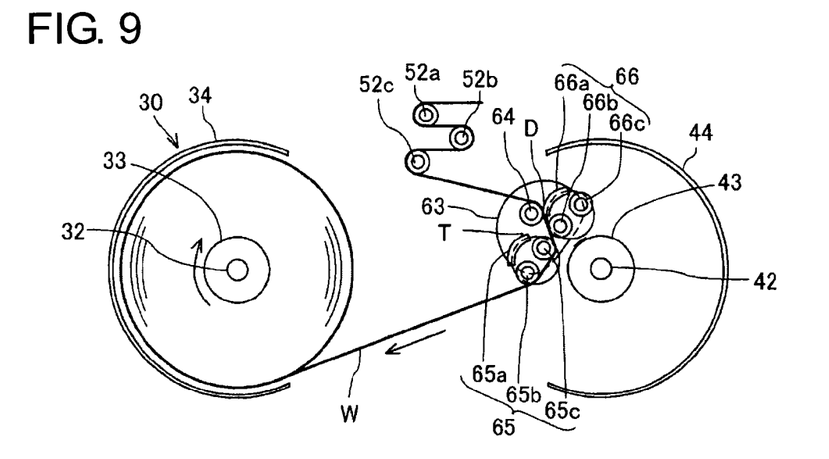
FIG. 9 is an illustration showing the state subsequent to the state shown in FIG. 8 and the state just before the cutting of the web.

Then, as shown in FIG. 9, in the state that the pivot plate 63 is positioned, the cutter unit 65 and the web pressing unit 66 are synchronously turned in mutually opposite directions. This brings about the state that the circular arc convex surface of the web pressing member 66a and the lead roller 64 hold the web W therebetween.

Figure 10:
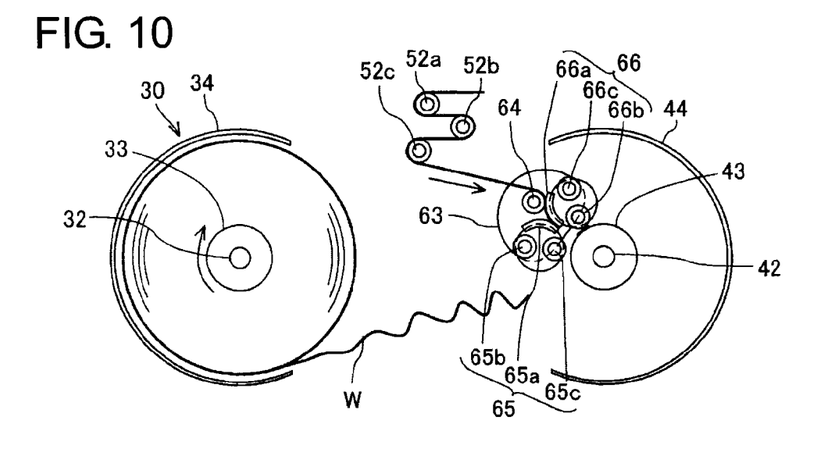
FIG. 10 is an illustration showing the state subsequent to the state shown in FIG. 9 and the state of being at the time of cutting the web.
Figure 11:
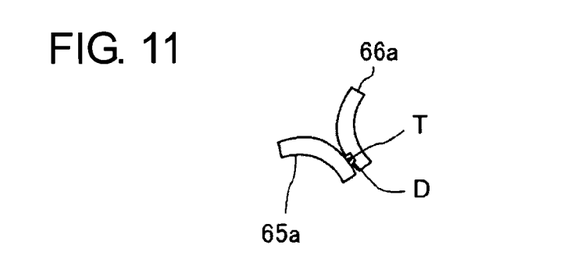
FIG. 11 is an illustration showing in an enlarged scale the cutter member and the web pressing member in the state of FIG. 10.

Then, as shown in FIG. 10, the cutter unit 65 and the web pressing unit 66 are synchronously turned further in the mutually opposite directions. Thus, the web W is pressed between the circular arc convex surface of the cutter member 65a and the circular arc convex surface of the web pressing member 66a to be held on the web pressing member 66a. At this time, as shown in FIGS. 10 and 11, the cutter T on the cutter member 65a enters the groove D on the web pressing member 66a to cut the web W existing therebetween. As a result, the cut end of the web W so cut is held by the cutter member 65a and the web pressing member 66a.

At this time, the vacuum pump P being in fluid communication with the web pressing member 66a is driven to draw dust produced at the time of cutting the web W, through the pump suction holes H1 at the groove D on the web pressing member 66a. At the same time, the drawing vacuum force through the pump suction holes H2 at the circular arc convex surface of the web pressing member 66a acts to draw and hold the end portion including the cut end of the web W so cut. By operating the web pressing member 66a to act as cutter receiving member and to hold the web W, the web pressing member 66a can reliably hold the cut end of the web W.

Figure 12:
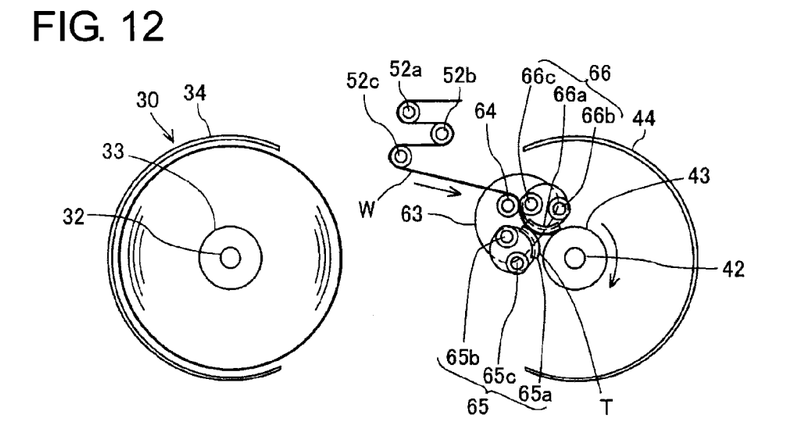
FIG. 12 is an illustration showing the state subsequent to the state shown in FIG. 10 and the state that the web pressing member presses a cut end of the web on the right bobbin.

Then, as shown in FIG. 12, the cutter unit 65 and the web pressing unit 66 are synchronously turned further in the mutually opposite directions, and the right bobbin 43 is rotated synchronously with the turn of the web pressing unit 66 in the opposite direction to the turn of the web pressing unit 66. This causes the web pressing member 66a to press the cut end of the web W on the right bobbin 43. Since at this time, the double-sided adhesive tape or adhesive on the right bobbin 43 is at the position facing the web pressing member 66a, the cut end of the web W begins to be wound on the right bobbin 43.

As mentioned above, the web pressing member 66a has the function of holding the cut end of the web W and the function of pressing the web W on the right bobbin 43. Accordingly, the web pressing member 66a is able to directly press the cut end of the web W on the right bobbin 43 as it keeps the state of holding the cut end of the web W. Thus, the cut end of the web W can reliably be wound by the web pressing member 66a on the right bobbin 43. As a result, the end portion (including the cut end) of the web W can be prevented from being folded or loosened when would on the right bobbin 43.

Particularly, by synchronously turning the cutter member 65a and the web pressing member 66a, it becomes possible to shorten the distance from the turn position of the cut end of the web W on the web pressing member 66a when the web W is cut, to the turn position of the cut end of the web W on the web pressing member 66a when the cut end of the web W begins to be wound on the right bobbin 43. Accordingly, it is possible to prevent the cut end of the web W from separating from the web pressing member 66a before being wound on the right bobbin 43. That is, it is possible to reliably wind the cut end of the web W on the right bobbin 43.

Figure 13:
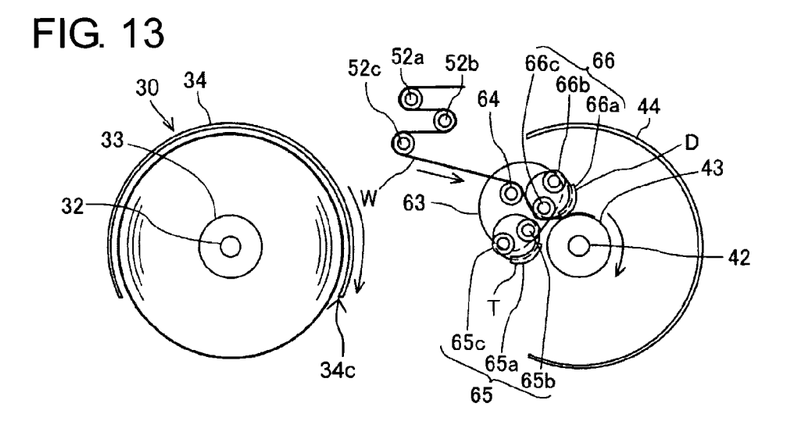
FIG. 13 is an illustration showing the state subsequent to the state shown in FIG. 12 and the state that the web pressing member completes the pressing of an end portion of the web on the right bobbin, and simultaneously showing the state that the left bobbin is ready for dismounting.

Then, as shown in FIG. 13, the cutter unit 65 and the web pressing unit 66 are synchronously turned further in the mutually opposite directions, whereby the web pressing member 66a terminates pressing the end portion of the wed W on the right bobbin 43.

Figure 14:
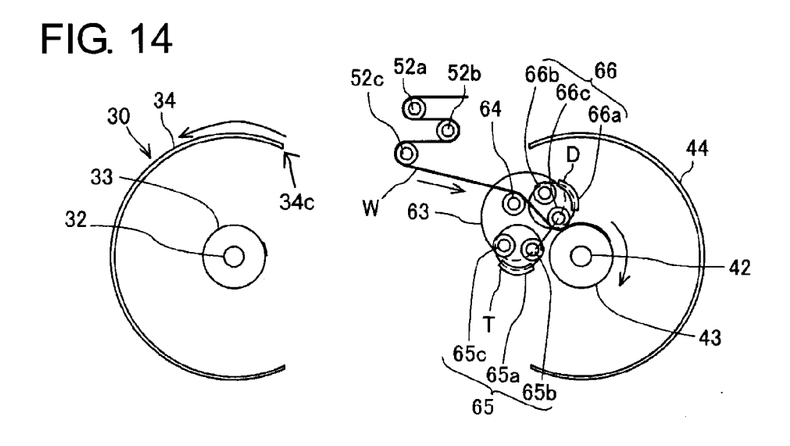
FIG. 14 is an illustration showing the state subsequent to the state shown in FIG. 13 and the state that a touch roller begins the pressing on a winding portion.

Then, as shown in FIG. 14, the cutter unit 65 and the web pressing unit 66 are synchronously turned further in the mutually opposite directions, and the turns of the both units 65, 66 are stopped at such a position that the second roller 66c of the web pressing unit 66 presses the outer peripheral surface of the right bobbin 43. While the web W is wound on the right bobbin 43, the second roller 66c remains pressing the outer peripheral surface of the wound web W.

In this way, the second roller 66c operates as touch roller that presses the outer peripheral surface of the wound web W. That is, from right after the turn of the web pressing member 66a, the second roller 66c acts to press the outer peripheral surface of the web W. Accordingly, the winding of the web W on the right bobbin 43 is carried out stably. For example, it can be prevented to involve the air or the like.

Figure 15:
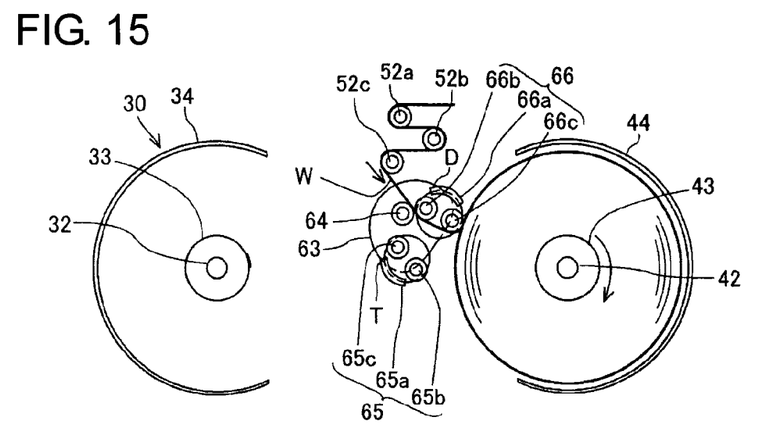
FIG. 15 is an illustration showing the state subsequent to the state shown in FIG. 14 and the state of being at the time of completing the winding of the web on the right bobbin.

As the transfer of the web W is continued, the right bobbin 43 becomes filled with winding turns of the web W, as shown in FIG. 15. During this time, the second roller 66c remains pressed on the outer peripheral surface of the web W being wound on the right bobbin 43.

Figure 16:
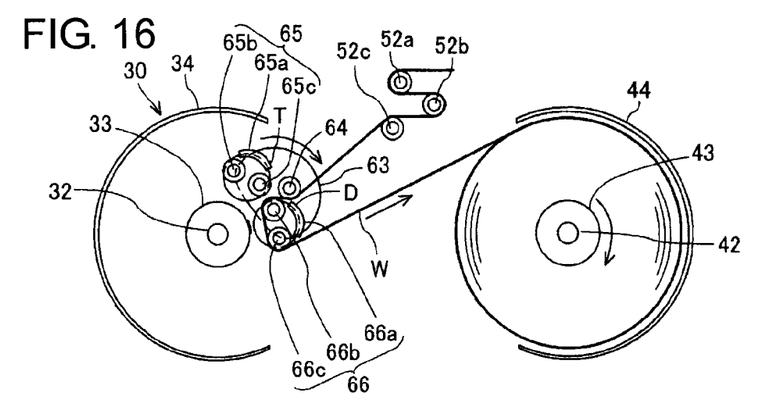
FIG. 16 is an illustration showing the state subsequent to the state shown in FIG. 15 and the state that upon completion of the winding on the right bobbin, the web cutting and joining device has been moved to the left bobbin side.

Then, as shown in FIG. 16, the slide head 62 is moved toward the left bobbin 33 side to the position where the pivot plate 63 is pivotable, and the pivot plate 63 is pivoted clockwise to take another set phase. Then, the cutter unit 65 and the web pressing unit 66 are directed toward the left bobbin 33 being empty. Further, the slide head 62 is moved toward the left bobbin 33 side to make the cutter unit 65 and the web pressing unit 66 come close to the left bobbin 33.

Thereafter, the same operations as done with the right bobbin 43 are carried out in turn with the left bobbin 33, as shown in FIGS. 17 to 21. Since like the right bobbin 43, the left bobbin 33 is rotated also clockwise, the web pressing member 66a in winding the end portion of the web W on the left bobbin 33 is located at the advanced side in the rotational phase of the left bobbin 43 relative to the cutter T of the cutter member 65a.

By doing so, it can be realized that the inside and outside of the web W wound on the left bobbin 43 come to agree with those of the web W wound on the right bobbin 33 in the radial direction. Further, by so providing the web pressing member 66a as to be able to rock relative to the cutter T of the cutter member 65a through the pivot movement of the pivot plate 63, it is possible as mentioned above to make the inside and outside of the web W wound on the left bobbin 43 come to agree with those of the web W wound on the right bobbin 33 in the radial direction even though each of the cutter T and the web pressing member 66a is provided by one only. As a result, the web winding apparatus can be downsized.

(Web Dismounting Operation in Web Winding Apparatus)

Next, the web dismounting operation in the web winding apparatus will be described with reference to FIGS. 1, 12 to 14 and 18 to 20. In the state shown in FIG. 12, the web W having been transferred to the left bobbin 33 has an end cut already. In this state, as shown in FIG. 13, the peripheral cover 34 on the left side is turned clockwise to direct the circumferential opening 34c of the peripheral cover 34 toward the bed 20 side (downward).

Thus, the peripheral cover 34 stands in position to partition the left bobbin 33 side and the lead roller 64 side (corresponding to the side where the cutter unit 65 and the web pressing unit 66 stand). At this time, the periphery cover 34 also stands in position to partition the left bobbin 33 side and the side where the transfer rollers 51a, 51b, 52a-52c stand.

After the positioning of the peripheral cover 34 as shown in FIG. 13, the opening/closing cover 12 on the left side is opened as shown in FIG. 1. Then, the operator dismounts the left bobbin 33 having been filled with winding turns of the web W from the rotational center member 32. During this time, the web W is being wound on the right bobbin 43, and the opening/closing cover 13 on the right side remains closed.

Because the lead roller 64, the cutter unit 65 and the web pressing unit 66 can be evacuated to the right side through the sliding movement of the slide head 62, it becomes possible to dismount the left bobbin 33 from the rotational center member 32 without moving the center of the left bobbin 33. Accordingly, the dismounting of the bobbin 33 can be realized by the simplified construction.

The peripheral cover 34 is configured to have the circumferential opening 34c. Thus, in winding the web W on the bobbin 33 as mentioned above, the web W can pass through the circumferential opening 34c of the peripheral cover 34. Therefore, the peripheral cover 34 does not constitute any obstacle in the winding of the web W on the bobbin 33.

In dismounting the left bobbin 33 from the rotational center member 32, on the other hand, the peripheral cover 34 is turned, whereby the peripheral cover 34 acts to partition the bobbin 33 side and the side where the lead roller 64 and the web W being transferred are located. Accordingly, the operator can safely dismount the bobbin 33 from the rotational center member 32. In particular, the degree of safety can be increased by designing the contour of a cover area of the opening/closing cover 12 to that resembled closely to, or somewhat larger than, the outer shape of the peripheral cover 34.

At the time of dismounting the left bobbin 33, the right opening/closing cover 13 whose cover area has a contour somewhat larger than the outer shape of the peripheral cover 44 remains covering the front side in the axial direction of the right bobbin 43 on which the web W is being wound. Therefore, the operator is prevented by the fixed cover 11, the right opening/closing cover 13 and the left peripheral cover 34 from touching the web W being transferred onto the right bobbin 43.

After the bobbin 33 having been filled with winding turns of the web W (i.e., filled-up bobbin 33) is dismounted from the rotational center member 32, another empty bobbin 33 is mounted on the rotational center member 32. Then, as shown in FIG. 14, the peripheral cover 34 is turned counterclockwise to direct the circumferential opening 34c of the peripheral cover 34 toward the right bobbin 43 side.

Figure 18:
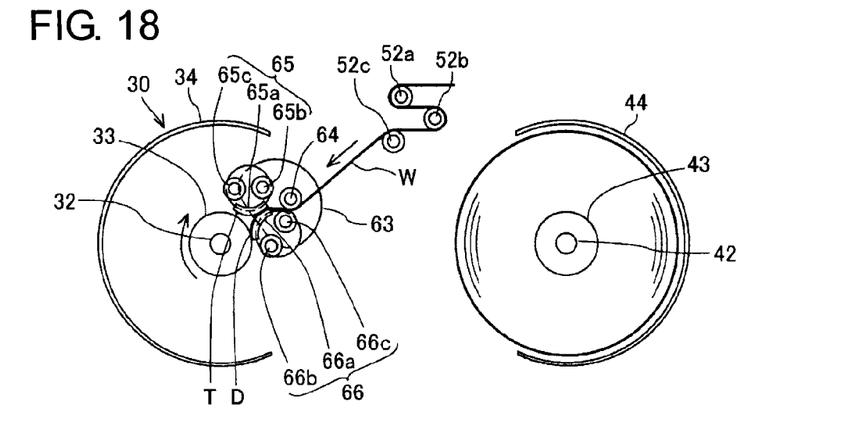
FIG. 18 is an illustration showing the state subsequent to the state shown in FIG. 17 and the state that the web pressing member presses a cut end of the web on the left bobbin.
Figure 19:
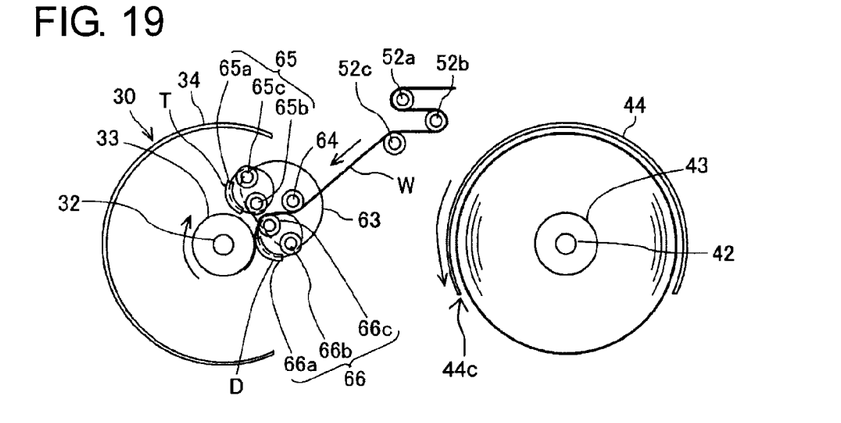
FIG. 19 is an illustration showing the state subsequent to the state shown in FIG. 18 and the state that the web pressing member completes the pressing of the web end portion on the left bobbin, and simultaneously showing the state that the right bobbin is ready for dismounting.
Figure 20:
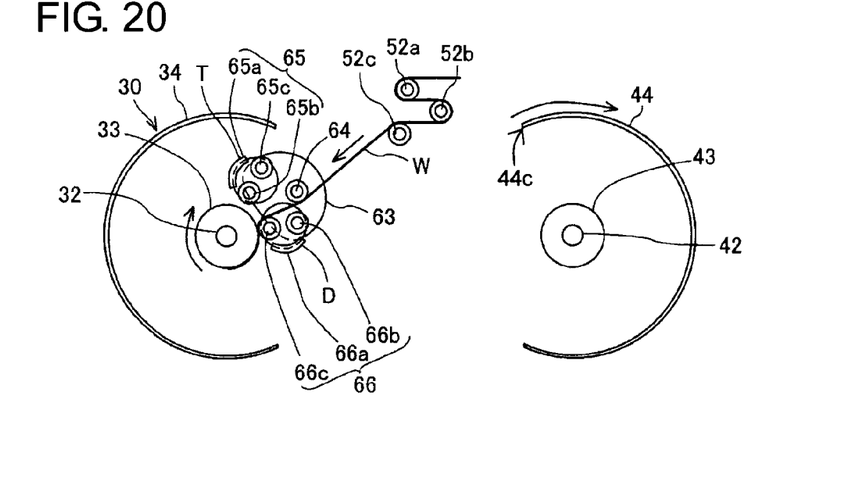
FIG. 20 is an illustration showing the state subsequent to the state shown in FIG. 19 and the state that the touch roller begins the pressing on a winding portion.
Figure 21:
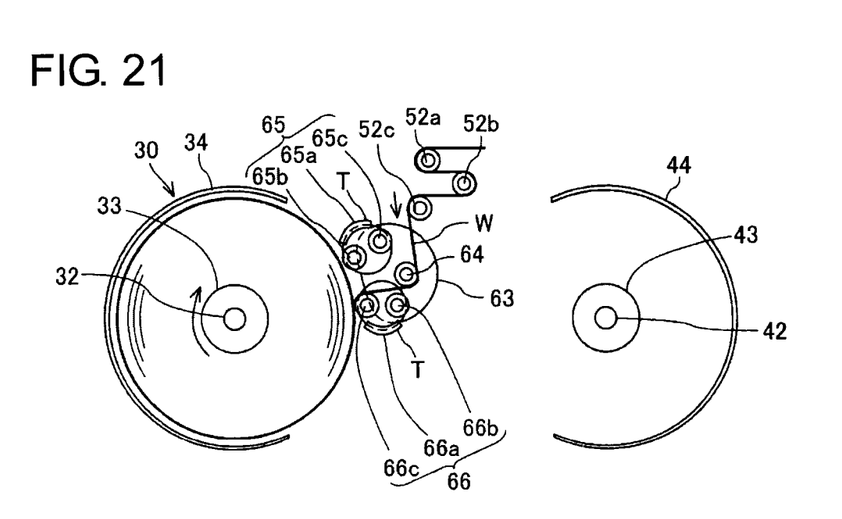
FIG. 21 is an illustration showing the state subsequent to the state shown in FIG. 20 and the state of being at the time of completing the winding of the web on the left bobbin.

After the right bobbin 43 becomes filled with winding turns of the web W, the dismounting operations that are substantially the same as those for the left bobbin 33 are carried out as shown in FIGS. 18 to 20. Also at this time, the operator can safely dismount the right bobbin 43 from the rotational center member 42.

(Operating Mechanisms for Covers)

The foregoing operations of the opening/closing covers 12, 13 and the peripheral covers 34, 44 may be performed manually. Preferably, in the present embodiment, the operations are performed by, for example, the mechanisms which will be described hereafter with reference to FIGS. 1-3 and 5. As shown in FIGS. 1 and 2, the opening/closing covers 12, 13 are provided at opposite sidewall portions in the left-right direction in FIG. 1 with hook members 12a, 13a extending outward. The hook members 12a, 13a have elongate slots (not numbered) and, with the opening/closing covers 12, 13 closed, are bent forward through an angle of about 45 degrees when viewed from above. In order to move the hook members 12a, 13a, there are provided pneumatic linear-motion cylinders 14, 15 whose piston rods are engaged with the hook members 12a, 13a at forward ends thereof, respectively. More specifically, the forward end of each piston rod passes through the elongate slot and puts the hook member 12a/13a between a pair of flanges 14b/15b provided at the forward end thereof. Therefore, by the operations of the linear-motion cylinders 14, 15, the opening/closing covers 12, 13 are pivotable about hinges 12b, 12b and 13b, 13b through an angle of 90 degrees or more between the closed position and the open position.

Figure 5:
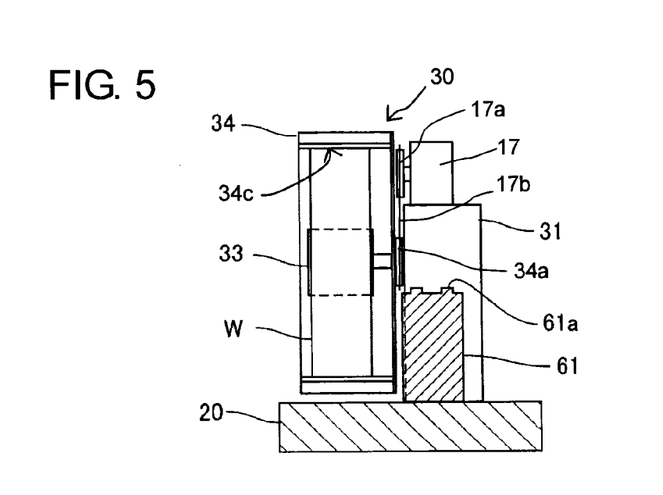
FIG. 5 is a sectional view of the apparatus taken along the line V-V in FIG. 3.

The peripheral covers 34, 44 are supported to be turnable around the respective rotational center members 32, 42, as mentioned earlier. As shown in FIGS. 3 and 5, the peripheral covers 34, 44 are coaxially provided with driven gears 34a, 44a, which are in driving connection with drive gears 17a, 18a fixed on output shafts of pneumatic rotary actuators 17, 18, through respective timing belts 17b, 18b. Thus, by the operations of the rotary actuators 17, 18, the peripheral covers 34, 44 are independently turned through an angle of about 90 degrees between the aforementioned first position to direct the circumferential openings 34c, 44c toward the cutting and joining device 60 and the aforementioned second position to direct the circumferential openings 34c, 44c toward the bed 20, as mentioned earlier.

When the bobbin 33 on the left side becomes filled with winding turns of the web W, the web W is cut as shown in FIG. 10, and the rotary actuator 17 is operated to turn the peripheral cover 34 to direct the circumferential opening 34c downward, and then, the linear-motion cylinder 14 is operated to turn the opening/closing cover 12 to the open position, as shown in FIG. 1. After the dismounting of the filled-up bobbin 33 from the rotational center member 32, another empty bobbin 33 is mounted on the rotational center member 32. Thereafter, the linear-motion cylinder 14 and the rotary actuator 17 are operated in turn. Thus, the opening/closed cover 12 is turned to the closed position to close the front side of the new empty bobbin 33 on the rotational center member 32, and the peripheral cover 34 is then turned counterclockwise to direct the circumferential opening 34c toward the cutting and joining device 60, whereby the new empty bobbin 33 become ready for the winding operation.

Figure 17:
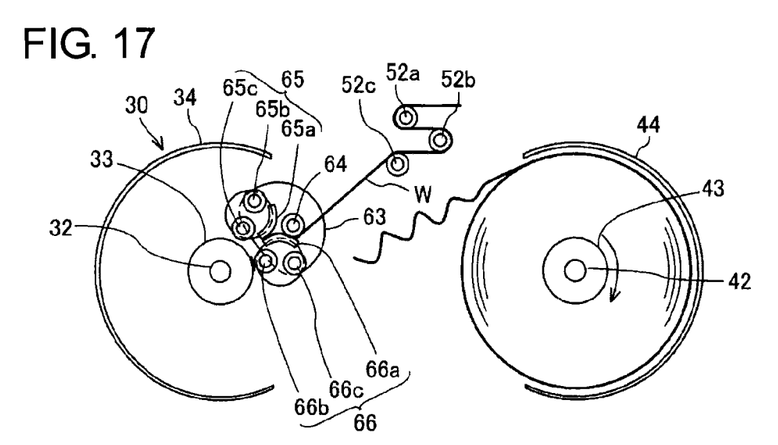
FIG. 17 is an illustration showing the state subsequent to the state shown in FIG. 16 and the state of being at the time of cutting the web.

On the other hand, when the bobbin 43 on the right side becomes filled with winding turns of the web W, the web W is cut as shown in FIG. 17, and operations like those aforementioned are carried out with the opening/closing cover 13 and the peripheral cover 44.

Although the linear-motion cylinders 14, 15 and the rotary actuators 17, 18 which are, preferably, of the pneumatically operated type are used, they may be of the type that are hydraulically operated or electrically actuated. Further, linkage mechanisms that connect the operations of the actuators 17, 18 and the cylinders 14, 15 to the peripheral covers 34, 44 and the opening/closing covers 12, 13 may take various kinds of mechanisms without being limited to the gear to gear belt connection and to the engagements with the hook members 12a, 13a.

Although in the foregoing embodiment, the support bodies 31, 41 of the first and second web support devices 30, 40 are fixed on the bed 20, the support bodies 31, 41 may be movable relative to the bed 20 in the front-read direction. By doing so, it becomes possible to advance the support devices 30, 40 forward in dismounting the bobbin 33/43 from the rotational center member 32/42, so that the dismounting work becomes easy.

Various features and many of the attendant advantages in the foregoing embodiment will be summarized as follows:

According to the feature in the first aspect of the forgoing embodiment, as typically shown in FIGS. 1-5 and 9 to 16, the cutter T, the web pressing member 66a and the roller 64 are movable between the two bobbins 33, 43. Then, when the winding of the web W on each bobbin 33/43 is completed, the cutter T, the web pressing member 66a and the roller 64 are evacuated, so that it becomes possible to dismount each such bobbin 33/43 from the rotational center member 32/42 without moving the same. Accordingly, it is not required to provide a large-scale transfer device as is required in the prior art, and hence, the transfer device can be simplified in construction though being able to continuously transfer the web W. Further, the apparatus is provided with the peripheral covers 34, 44 having the circumferential openings 34c, 44c. In winding the web W on each of the bobbins 33, 43, the web W is enabled to pass through the circumferential opening 34c/44c of the peripheral cover 34/44 mating with each such bobbin 33/43. Therefore, the peripheral covers 34, 44 do not impede the winding of the web W on the bobbin 33/43 mating therewith. On the other hand, in dismounting each bobbin 33/43 from the rotational center member 32/42, the peripheral cover 34/44 mating with each such bobbin 33/43 is turned to partition the roller 64 side and the bobbin 33/43 side. Accordingly, the operator can safely dismount each bobbin 33/43 from the rotational center member 32/42.

According to the feature in a second aspect of the foregoing embodiment typically shown in FIGS. 13 and 19, in dismounting the bobbin 33/43 from one of the rotational center members 32, 42, the peripheral cover 34/44 covering the bobbin 33/43 to be dismounted stands at the second position to partition the one side of the bobbins 33, 43 and the side where the web W is being transferred to the other bobbin 33/43. This enables the operator to dismount the bobbin 33/43 from one of the rotational center members 32, 42 further safely.

According to the feature in a third aspect of the foregoing embodiment typically shown in FIGS. 3 and 5, the two peripheral covers 34, 44 have front sides opened to enable the bobbins 33, 43 to be dismounted respectively from front sides of the peripheral covers 34, 44 by being moved in the axial direction of the rotational center members 32, 42. Therefore, during the winding of the web W on one of the bobbins 33, 43, the operator can easily dismount the other of the bobbins 33, 43 from the front side of the peripheral cover 34/44 mating therewith safely with the peripheral cover 34/44 partitioning a dismounting operation area and an ongoing winding operation area.

According to the feature in a fourth aspect of the foregoing embodiment typically shown in FIGS. 1 and 2, the two opening/closing covers 12, 13 are provided for respectively covering the front sides of the two peripheral covers 34, 44. Thus, when one of the bobbins 33, 43 is dismounted from the rotational center member 32/42, the front side in the axial direction of the other bobbin 43/33 on which the web W is being wound remains closed by the opening/closing cover 13/12 mating therewith. Accordingly, because of being protected by the peripheral cover 34/44 covering the bobbin 33/43 to be then mounted and the opening/closing cover 13/12 remaining closed to cover the front side of the other bobbin 43/33, the operator can further safely dismount the bobbin 33/43 from the rotational center member 32/42 during the winding of the web W on the other bobbin 43/33.

Obviously, numerous further modifications and variations of the present invention are possible in light of the above teachings. It is therefore to be understood that within the scope of the appended claims, the present invention may be practiced otherwise than as specifically described herein.

What is claimed is:
1. A web winding apparatus comprising:
support bodies;
two rotational center members rotatably supported respectively by the support bodies;
two bobbins supported respectively by the two rotational center members;
a cutter provided movably between the bobbin on one side and the bobbin on the other side for cutting a web being transferred;
a web pressing member provided movably together with the cutter and operable for pressing an end portion of the web cut with the cutter, on the bobbin being empty to wind the end of the web on the empty bobbin;
a roller provided movably together with the cutter and operable for transferring the web being transferred to come toward the bobbins; and
two peripheral covers provided on the support bodies to be independently turnable around the rotational center members and respectively covering parts of outer peripheral surfaces of the webs wound on the two bobbins, each of the peripheral covers having a circumferential opening;
wherein each of the peripheral covers respectively covering the bobbins is turnable selectively to a first position to direct the circumferential opening toward the position of the roller when winding the web on one of the bobbins and a second position to partition the one side of the bobbins and position of the roller when dismounting the one of the bobbins from one of the rotational center members.

2. The web winding apparatus in claim 1, wherein the two peripheral covers have front sides opened to enable the bobbins to be dismounted respectively from front sides of the peripheral covers by being moved in the axial direction of the rotational center members.

3. The web winding apparatus in claim 2, further comprising:
    two opening/closing covers provided for respectively covering the front sides of the two peripheral covers, each of the two opening/closing covers being selectively turnable to a closed position to close the front side of the peripheral cover mating therewith and an open position to open the front side of the peripheral cover mating therewith for enabling the bobbin filled with winding turns of the web to be dismounted from the front side of the peripheral cover mating therewith.

\* \* \* \* \*